Figure 5:
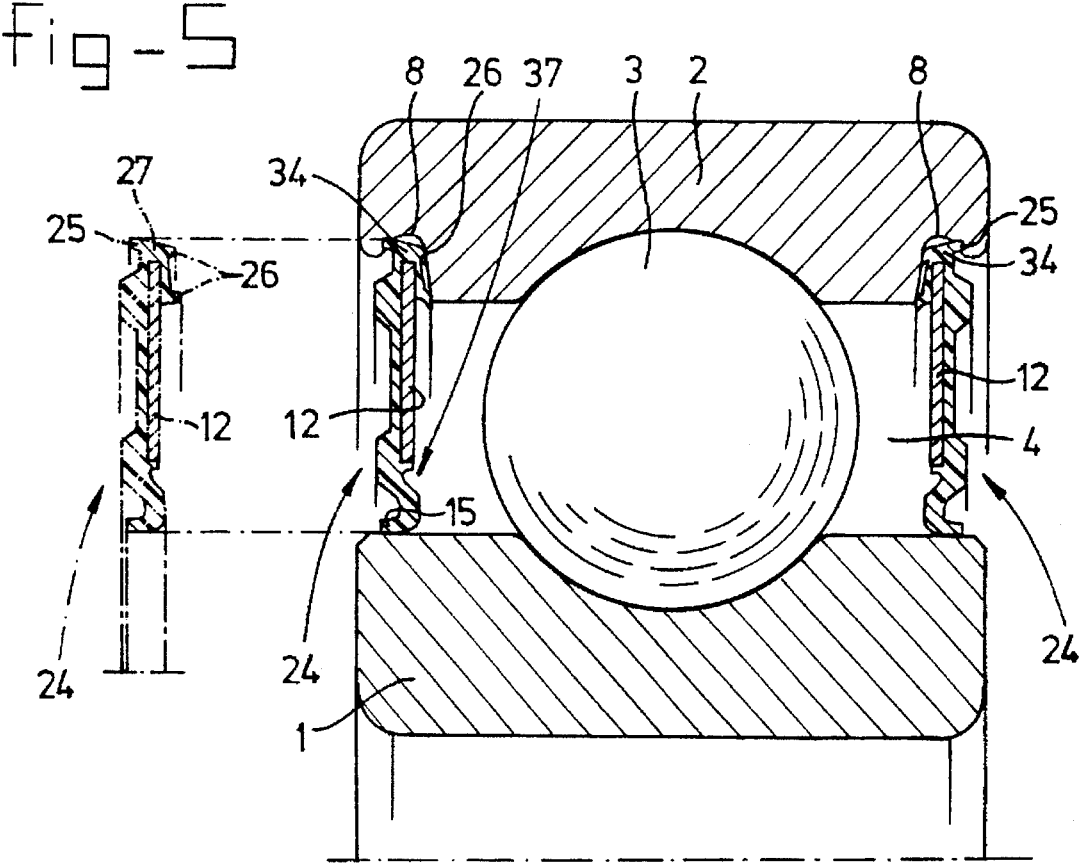

United States Patent [19]
Schlereth et al.

[11] Patent Number: 5,649,772
[45] Date of Patent: Jul. 22, 1997

[54] ROLLING BEARING WITH OIL SEAL

[75] Inventors: Armin Schlereth, Schweinfurt, Germany; Johan Christian Marinus Bras, Tricht; Jan Greving, Benschop, both of Netherlands

[73] Assignee: SKF Industrial Trading & Development Company, B.V., Nieuwegein, Netherlands

[21] Appl. No.: 544,276

[22] Filed: Oct. 17, 1995

[30] Foreign Application Priority Data

Oct. 18, 1994 [NL] Netherlands ............................ 9401721

[51] Int. Cl.⁶ ............................................ F16C 33/80
[52] U.S. Cl. ......................... 384/484; 277/94; 384/485
[58] Field of Search ............................ 384/477, 480, 384/484, 485, 486, 488; 277/37, 152, 94, 95

[56] References Cited

U.S. PATENT DOCUMENTS

| | | | |
|---|---|---|---|
| 3,028,203 | 4/1962 | Lund et al. | |
| 3,400,989 | 9/1968 | Dixon et al. | 277/94 X |
| 3,473,856 | 10/1969 | Helms | |
| 3,556,539 | 1/1971 | Senigalliesi | 277/94 |
| 3,709,572 | 1/1973 | Pethis | 384/485 X |
| 4,428,629 | 1/1984 | Colanzi et al. | 384/485 |
| 4,544,168 | 10/1985 | Hans et al. | 384/486 X |
| 4,805,919 | 2/1989 | Wiblyi et al. | 384/477 X |
| 4,830,518 | 5/1989 | Shiratani et al. | 384/448 |

FOREIGN PATENT DOCUMENTS 1581126  9/1969  France.

*Primary Examiner*—Thomas R. Hannon

[57] ABSTRACT

A rolling bearing comprises an inner race and an outer race which together enclose a bearing space in which rolling elements are accommodated, which bearing space is sealed off by means of seals fixed on the outer race. In order to prevent oil leakage, provision is made for the fastening between each seal and the outer race to be liquid-tight. The outer race can comprise at least one groove in which a seal is accommodated, while an elastic shut-off element can be provided, which shut-off element is accommodated in the groove.

19 Claims, 3 Drawing Sheets

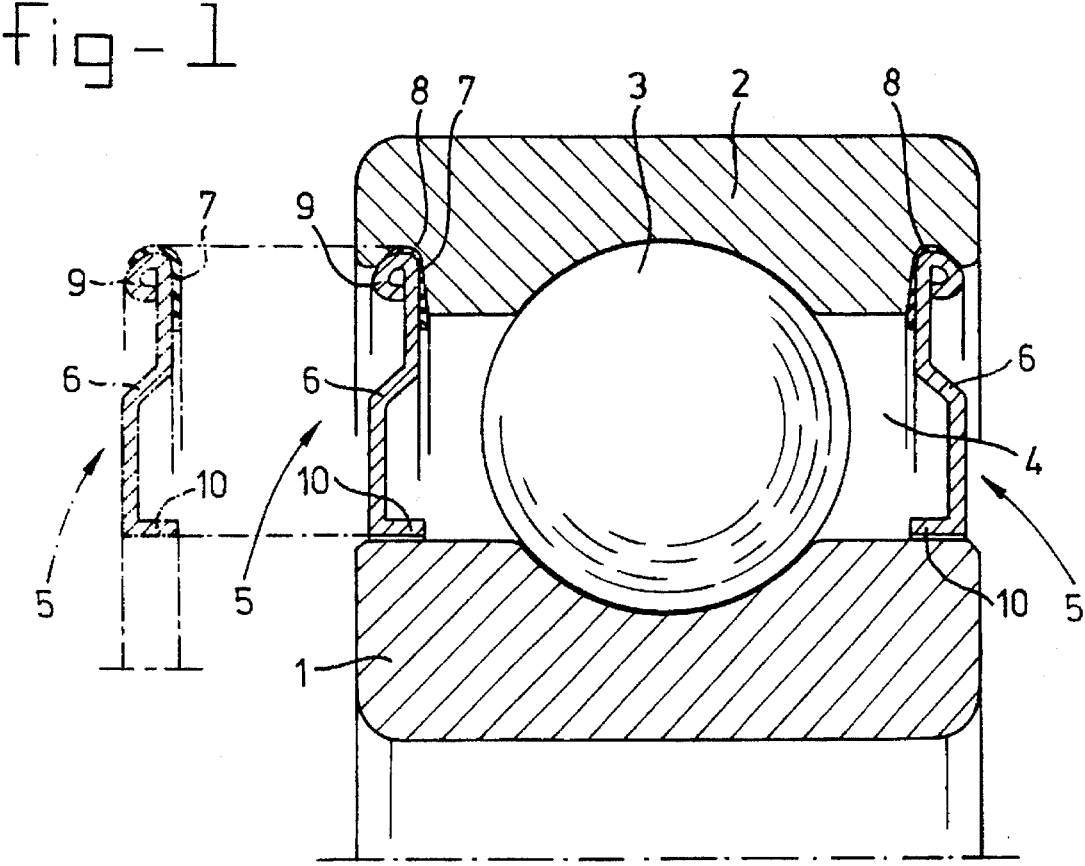
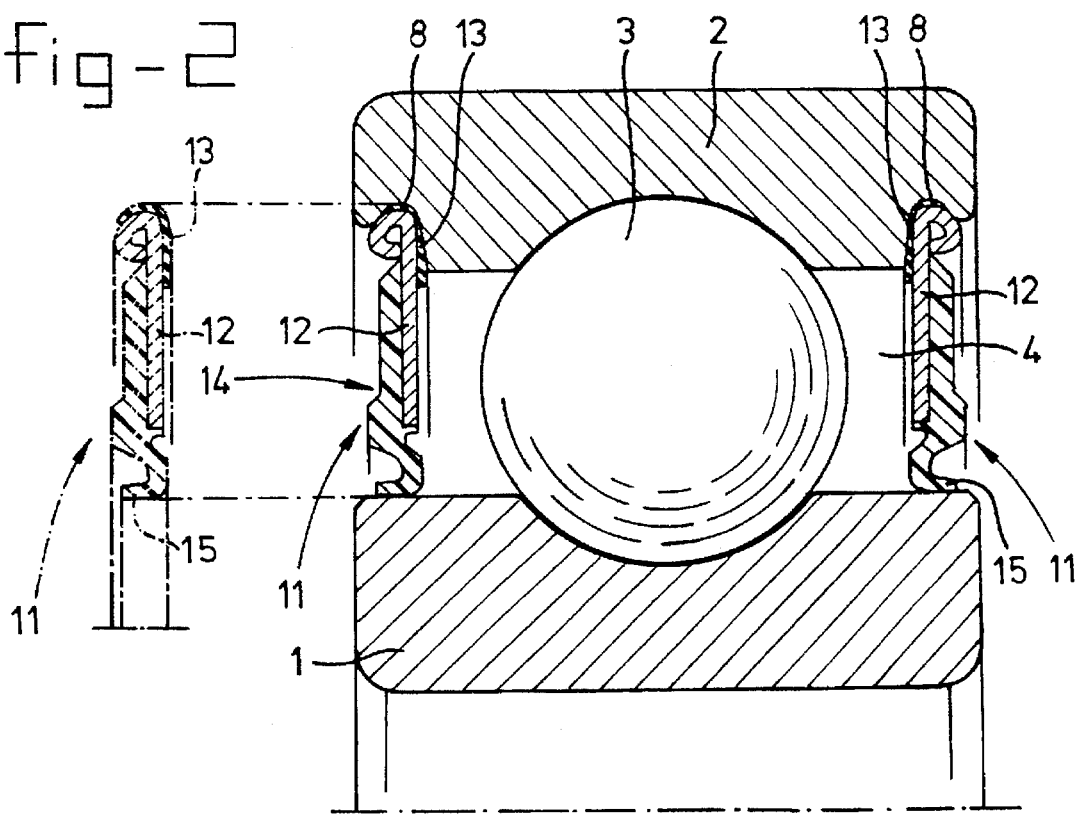

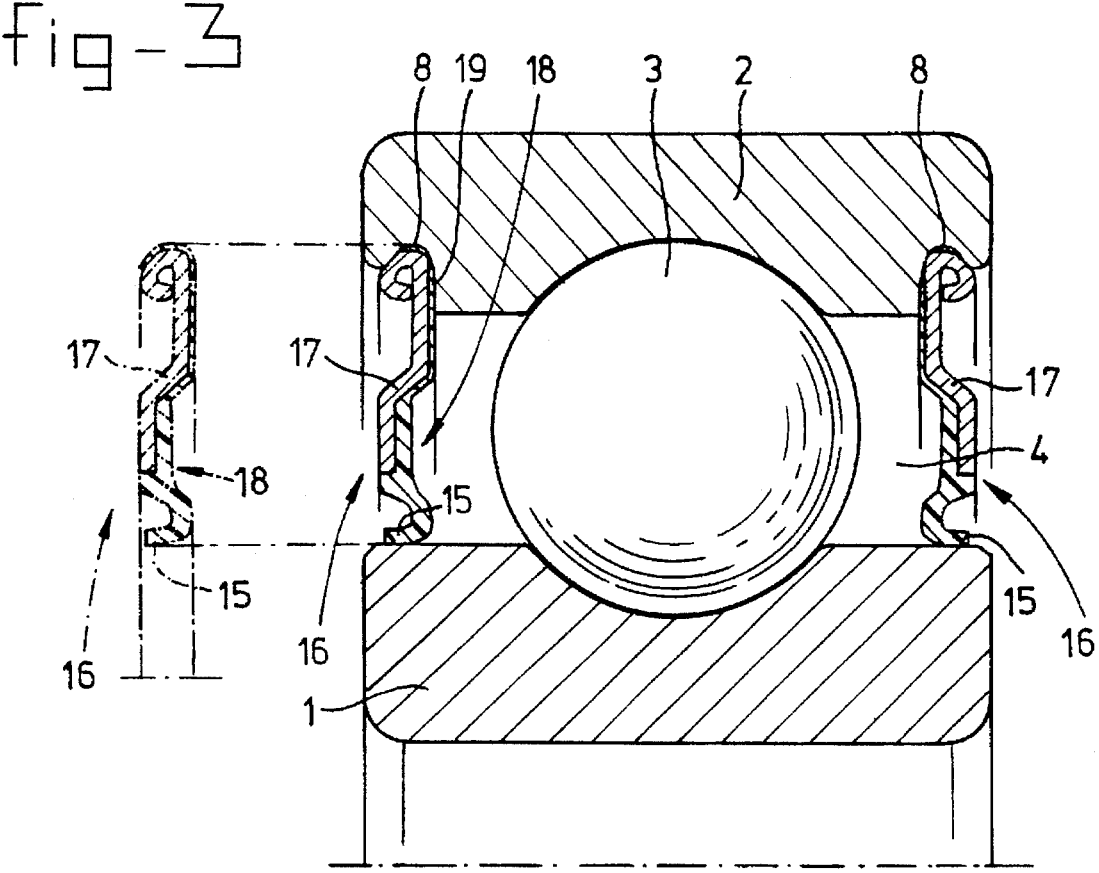
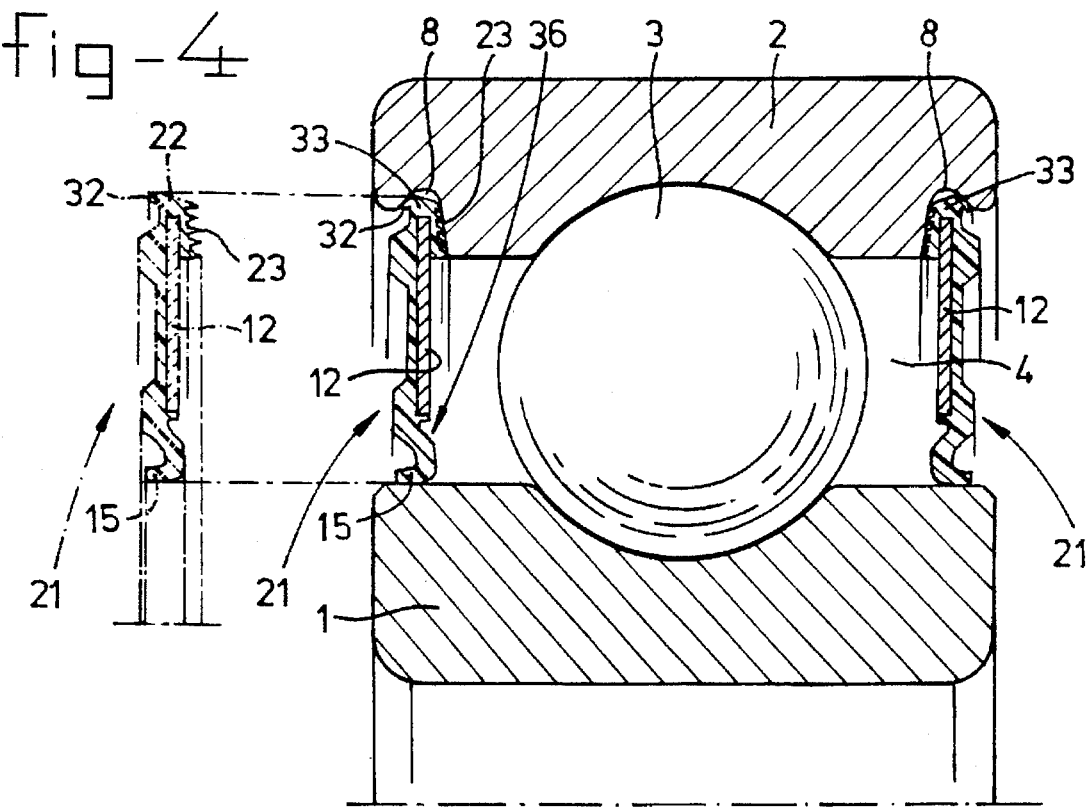

ROLLING BEARING WITH OIL SEAL

The invention relates to a rolling bearing, comprising an inner race and an outer race which together enclose a bearing space in which rolling elements are accommodated, which bearing space is sealed off by means of seals fixed on the outer race.

Such rolling bearings are generally known. They are used both in situations in which the inner race rotates and the outer race is stationary and in situations in which the outer race rotates and the inner race is stationary. An example which can be mentioned is the bearings of fans, of the type found in air-conditioning equipment.

In the latter case great centrifugal forces occur, as a result of which the grease present in the bearing is forced to the outer regions of the bearing space. The problem here is that considerable weight losses in grease occur.

Until now it was assumed that this weight loss arose from the grease leaking out, i.e. out of the bearing space. According to accepted opinion, this occurred through the gap between the inner race and the seal.

However, it has now been found that the weight loss in grease is due entirely to the disappearance of the oil component from the grease. It is mainly the soap component which remains behind in the bearing space. Under the influence of the centrifugal forces of the type occurring during rotation of the outer race, the oil is separated from the grease, following which the quite liquid oil can escape from the bearing space through the generally leaky connection between seal and outer race.

This leakiness can be due to tolerance deviations in the dimensions of the recess of the outer race in which the seal is accommodated. Moreover, the presence of impurities, surface roughness, differences in thermal expansion, seal tolerances, permanent deformation, shrinkage, creep and the like can give rise to leakiness, and thus to leakage of oil.

The object of the invention is then to provide a rolling bearing in which the real cause of the weight loss in grease is effectively countered. That object is achieved through the fact that the fastening between each seal and the outer race is liquid-tight.

Due to the liquid-tight fastening, the oil coming out of the grease can no longer leak out of the bearing, with the result that the lubrication is maintained. In particular, the fastening also prevents leaking out of oil which is pressurized as a result of centrifugal forces.

According to a common design, the outer race has at least one groove in which a seal is accommodated, while an elastic shut-off element is provided, which shut-off element is clamped between the seal and the groove. The shut-off element clamped in the groove can guarantee the desired sealing effect between outer race and seal.

The seal can comprise a ring made of a rigid material such as a metal, and the shut-off element can be clamped between the outer peripheral area of the ring and the surface of the groove lying opposite said ring.

According to a known design, the ring, which is made of a rigid material, can bear a flexible sealing lip which extends to the inner race. In that case the sealing lip can extend until it is over the outer peripheral area of the ring, thus forming the shut-off element.

In order to obtain a good seal, the shut-off element is of a labyrinth type. In this case the shut-off element can bear at least two teeth on its surface facing the bearing space and one tooth on its opposite surface.

The invention will now be explained in greater detail with reference to a number of exemplary embodiments shown in the figures.

FIGS. 1 to 6 each show an exemplary embodiment of a rolling bearing according to the invention, in radial section.

The rolling bearing shown in FIGS. 1 to 6 comprises an inner race 1, an outer race 2, and ball-shaped rolling elements 3 which are situated in the inside bearing space 4. The bearing space 4 is shut off at both sides by a seal indicated by 5 in FIG. 1.

The seal 5 comprises a metal ring 6, on the outer periphery of which a flexible layer, for example a latex-based paint, forming a shut-off element 7 is provided. Recesses 8, in which the seal 5 is fixed, are provided in a known manner in the outer race 2. For this purpose, the seal 5, in particular its ring 6, is pressed into the groove 8, thus forming the beaded edge 9, in the course of which the shut-off element 7 is compressed. Said shut-off element 7 provides the desired tightness between seal 5 and outer race 2, in such a way that while the outer race is rotating no leakage can occur under the influence of centrifugal forces.

The seal 5, with the shut-off element 7 thereon in the free position, is shown by dashed lines in FIG. 1.

As shown in FIG. 1, the metal ring 6 extends until it is close up to the inner race 1, where it bears an inward-flanged lip 10.

In the exemplary embodiment of FIG. 2 a seal 11 which bears a metal ring 12 is used. Said metal ring 12 has a sealing element in the form of a compressible, flexible layer 13 which is clamped in the groove 8 of the outer race 2, all the above as already discussed with reference to the first exemplary embodiment.

A flexible sealing lip, which is indicated in its entirety by 14, and whose lip part 15 rests against the inner race 1, is provided on the Ping 12. Sealing lip 14 is separate from sealing element 13.

Seals 16 are also provided in the variant of FIG. 3, said seals comprising a metal ring 17 and an elastic sealing lip 18. Said sealing lip 18 extends integrally with the sealing element 19 over the entire metal ring 17, said sealing element 19 being clamped in the groove 8. The sealing lip 18 also has a lip part 15 which rests against the inner race.

A variant of FIG. 2 is shown in the exemplary embodiment of FIG. 4. The seal 21 thereof comprises a metal ring 12, and also a sealing lip 36 having a lip part 15 at one side. At the other side the sealing lip 36 is continued in one piece around the metal ring 12, forming a flexible shut-off element 22. Said shut-off element 22 bears inward-pointing teeth 23, which are pressed flat into the groove 8 of the outer race 2 when the shut-off element is fitted.

The exemplary embodiment of FIG. 4 also has an outwardpointing tooth 32, which likewise is compressed in the groove 8. Tooth 32 ensures that teeth 23 are held pressed at the correct initial stress against the wall of the groove 8 of outer race 2.

In the exemplary embodiment of FIG. 5 a seal 24 with a metal ring 12 is used. Seal 24 also comprises s sealing element 34 and sealing lip 37 which are integral. Said sealing element bears two teeth 26 and an opposite tooth 25. When the sealing element is fitted, the teeth 25 and 26 keep each other pressed firmly against the walls of the groove 8. Sealing lip 38 also bears a sealing lip 15.

Figure 6:
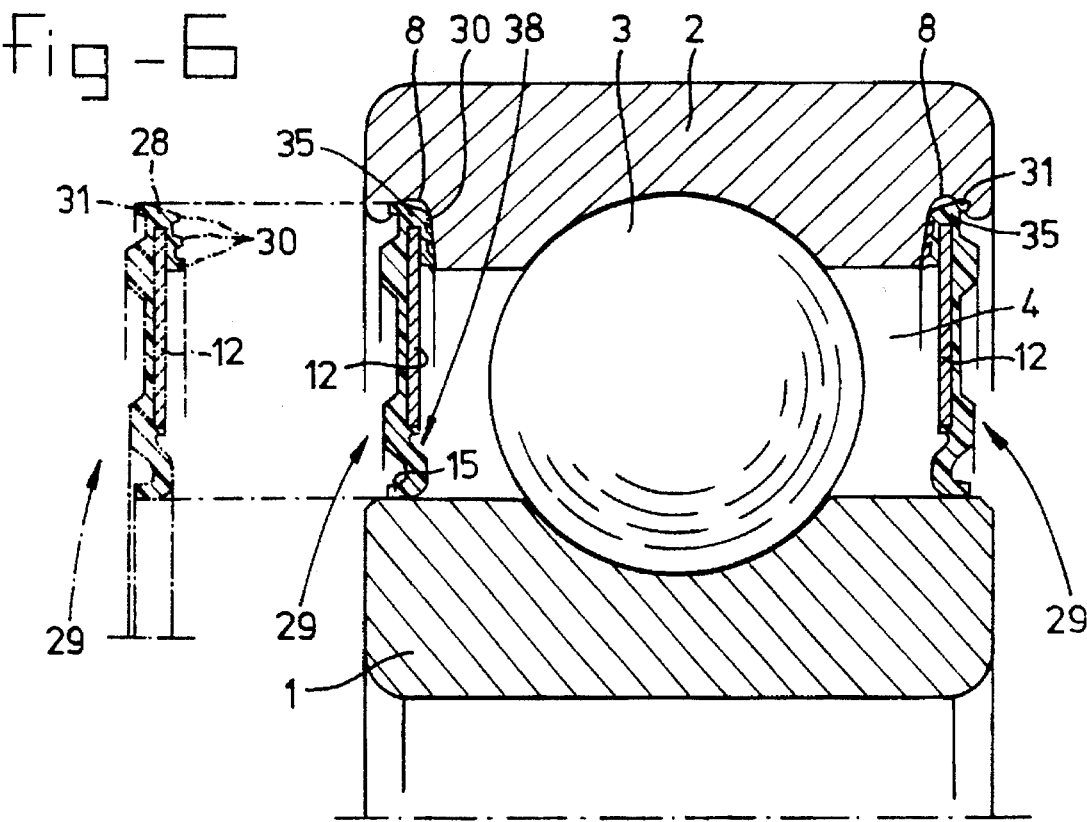

In the exemplary embodiment of FIG. 6, which is very similar to the exemplary embodiment of FIG. 5, the sealing element 35 bears three teeth 30, facing the bearing space 4, and a tooth 31 lying opposite.

We claim:

1. A rolling bearing including an inner race and an outer race which together enclose a bearing space in which rolling elements are accommodated, which bearing space is sealed off by means of seals fixed on the outer race, improvement comprising means fastening each seal to the outer race, said means being liquid-tight with respect to oil which is pressurized due to the centrifugal action resulting from rotating movement of the bearing;

said means comprising a wall portion of the outer race formed as a circular groove, said seal formed as a ring whose outer peripheral edge is situated in said circular groove, and a ring shaped shut off element situated at least between one wall of said groove and an adjacent surface of said seal, said shut off element and said adjacent surface of said seal being clamped in said groove.

2. Rolling bearing according to claim 1, comprising an outer race with at least a groove in which a seal is accommodated, while an elastic shut-off element is provided, which shut-off element is clamped in the groove.

3. Rolling bearing according to claim 2, in which the fastening between each seal and the outer race is liquid-tight with respect to oil which is pressurized due to the centrifugal action resulting from rotating movement of the bearing.

4. Rolling bearing according to claim 2, in which the shut-off element is of a labyrinth type.

5. Rolling bearing according to claim 4, in which the fastening between each seal and the outer race is liquid-tight with respect to oil which is pressurized due to the centrifugal action resulting from rotating movement of the bearing.

6. Rolling bearing according to claim 4, in which the shut-off element bears at least two teeth on its surface facing the bearing space and one tooth on its opposite surface.

7. Rolling bearing according to claim 6, in which the fastening between each seal and the outer race is liquid-tight with respect to oil which is pressurized due to the centrifugal action resulting from rotating movement of the bearing.

8. Rolling bearing according to claim 2, in which the seal comprises a ring made of a rigid material, and the shut-off element is clamped between the outer peripheral area of the ring and the surface of the groove lying opposite said ring.

9. Rolling bearing according to claim 8, in which the shut-off element is of a labyrinth type.

10. Rolling bearing according to claim 9, in which the shut-off element bears at least two teeth on its surface facing the bearing space and one tooth on its opposite surface.

11. Rolling bearing according to claim 8, in which the fastening between each seal and the outer race is liquid-tight with respect to oil which is pressurized due to the centrifugal action resulting from rotating movement of the bearing.

12. Rolling bearing according to claim 8, in which the ring, which is made of a rigid material, bears a flexible sealing lip which extends to the inner race.

13. Rolling bearing according to claim 12, in which the shut-off element is of a labyrinth type.

14. Rolling bearing according to claim 13, in which the shut-off element bears at least two teeth on its surface facing the bearing space and one tooth on its opposite surface.

15. Rolling bearing according to claim 12, in which the fastening between each seal and the outer race is liquid-tight with respect to oil which is pressurized due to the centrifugal action resulting from rotating movement of the bearing.

16. Rolling bearing according to claim 12, in which the sealing lip and the shut-off element are integral and extend over the ring.

17. Rolling bearing according to claim 16, in which the shut-off element is of a labyrinth type.

18. Rolling bearing according to claim 17, in which the shut-off element bears at least two teeth on its surface facing the bearing space and one tooth on its opposite surface.

19. Rolling bearing according to claim 16, in which the fastening between each seal and the outer race is liquid-tight with respect to oil which is pressurized due to the centrifugal action resulting from rotating movement of the bearing.

* * * * *